United States Patent
Wirfelt

[11] 3,905,081
[45] Sept. 16, 1975

[54] TOOL HOLDER

[75] Inventor: Sven Axel Olof Wirfelt, Sandviken, Sweden

[73] Assignee: Sandvik Aktiebolag, Sandviken, Sweden

[22] Filed: May 29, 1974

[21] Appl. No.: 474,187

[30] Foreign Application Priority Data
June 5, 1973   Sweden .............................. 7307874

[52] U.S. Cl. .................................................. 29/96
[51] Int. Cl.² ......................................... B26D 1/00
[58] Field of Search ......................................... 29/96

[56] References Cited
UNITED STATES PATENTS
| 3,192,603 | 7/1965 | Greenleaf ............................... 29/96 |
| 3,408,721 | 11/1968 | Berry, Jr. ................................ 29/96 |
| 3,488,823 | 1/1970 | Wirfelt ................................... 29/96 |

*Primary Examiner*—Harrison L. Hinson
*Attorney, Agent, or Firm*—Pierce, Scheffler & Parker

[57] ABSTRACT

A cutting insert, having a pin-receiving bore therein, is clamped in a toolholder by the use of a clamping element exerting a wedging force between a surface on the holder and an edge surface on the insert.

2 Claims, 2 Drawing Figures

TOOL HOLDER

The present invention relates to a toolholder in which a cutting insert is mechanically clamped, against a pin that enters into a hole in the insert, by means of a wedge clamp acting on an edge surface of the insert, thus urging the insert against the pin.

In such pinholders the insert is located in clamped position against a pin in the insert-receiving site of the holder. The insert is brought into clamped position between the pin and an abutment surface of the holder facing the pin. It has been suggested to have the pin acting laterally, the lateral abutment surface of the holder facing said pin then being fixed, or to have said pin fixed, said last-mentioned abutment surface then being movable. The movement of the pin might, for instance, be effected by making it as an excenter, the clamping of said pin then being effected by turning the pin around or by tilting the pin around a fixed abutment situated underneath the point of abutment between the pin and the insert. The abutment surface facing said pin might be movable by making it wedge-shaped.

There are various wedge clamping means with which a wedge-shaped insert-contactable clamping surface is moved towards a surface of the holder against which the underside of the insert is clamped. This is very unsuitable inter alia because with an unplain surface condition the fore end of the insert is liable to rise from its bottom supporting surface. Vibrations and breakage of the insert may occur as a result thereof. Instead it is desirable that the insert-contactable clamping surface be caused to move upwards somewhat at the clamping.

Figure 1A:
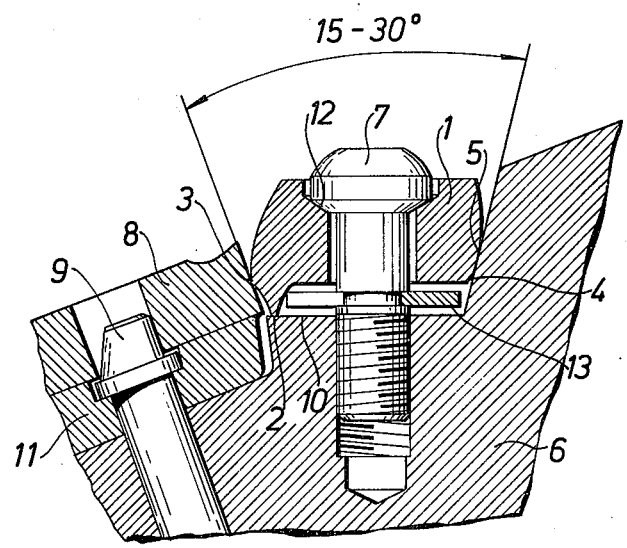
Figure 1B:
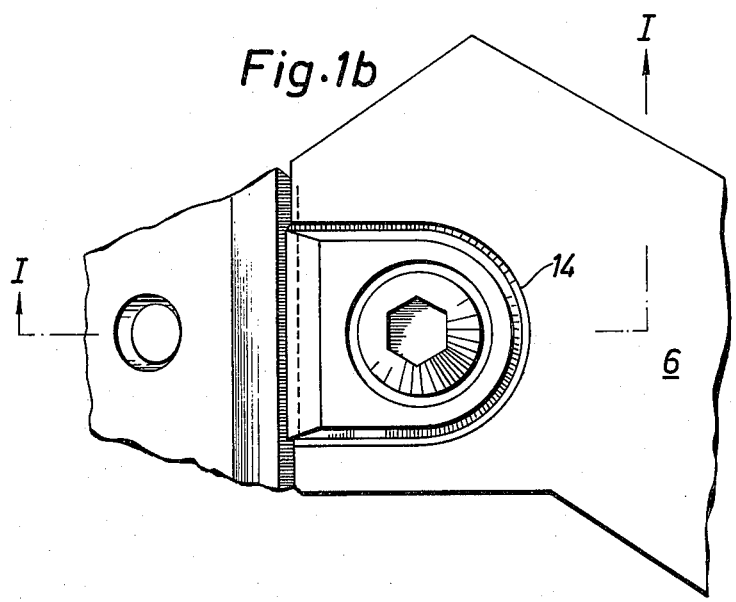

An object of the present invention is to provide a solution of the above-related problem. Closer details of the invention are described in the following specification, taken with the appended drawing, in which:

FIG. 1a is a section on line I—I in FIG. 1b, showing a section of the insert site in a toolholder according to the invention, and FIG. 1b is an elevational top view of the toolholder shown in FIG. 1a.

In FIG. 1a there is shown the inside of the insert site, where the clamping means is situated, the cutting portion per se being omitted. The cutting insert 8 is of the common indexable type, having a chip breaker recess along the cutting edges. The clamp 1 acts on the part of the insert which in the clamped position is not being used for cutting. The clamping surface 2 acts on a surface 10 in the toolholder 6, and clamping surface 3 acts on an adjacent edge surface of the insert. The clamping surface 2 in this example is formed as a vertically extending ridge or projection. The opposite part of the clamp abuts against a straight surface 4 in the holder at a contact point 5.

In the illustrated case, the surface 4 is inclined, the angle between said surface 4 and the edge surface of the insert being 15°–30°. When the clamping screw 7 is tensioned the clamp 1 acts as a wedge, clamping surface 2 then acting on the surface 10 and clamping surface 3 acting on the adjacent edge surface of the insert, thus urging said insert against the pin 9 that enters into a hole in said insert. The underside of the insert rests on a detachable shim plate 11.

In order to obtain a wedging effect of the clamp for urging the insert against the pin 9 the clamp must be able to perform a small rotating movement around the line of contact between clamping surface 3 and the edge surface of the insert, and for this purpose the opposite part of the clamp is given a convex shape. In said rotating movement the projection 2 slides on surface 10 and approaches the insert 8, thus causing a very small upward movement of the clamping surface 3 that is enough to assure abutment between the fore end of the insert and its bottom support surface in the insert site, which upward movement, however, being so insignificant that such rise of clamping surface 3 will have no negative consequences as to the clamping of the insert.

The clamping surfaces 2 and 3 suitably have the shape of convexly rounded ridges. Alternatively, one or both of said clamping surfaces may be broken or constituted by projections in rows.

The underside of the head 12 of the screw 7 is spherical, and it rests on a matching surface on the clamp in order to secure a close conact when the clamp takes different angular positions during the tensioning of the screw 7. A slotted disc 13 is mounted on the screw below the clamp, to provide means for raising the clamp from its clamped position when it is loosened.

As regarded in FIG. 1b, the rear edge 14 of the clamp has, in top elevation, a circular shape, but it may alternatively be straight.

I claim:

1. Toolholder for a clamped insert, said toolholder having
   an insert site, from a bottom surface of which there projects
   a pin;
   an insert having a pin-receiving bore;
   said insert being positioned on said pin;
   a clamping element positioned for wedging engagement between a wedging surface in the toolholder facing said pin and an opposite edge surface of said insert on said pin; and
   an actuating device to urge the clamping element towards an abutment surface in the holder between said wedging surface and the pin,
   said clamping element having two projections in spaced relation, one said projection being a clamping surface acting on said edge surface of the insert, the other said projection being a support surface acting slidably on said abutment surface in the holder between the actuating device and the insert, so that said clamping element is performing a small rotation movement upon the tensioning of said actuating device whereby a slight rotational movement is imparted to the insert in a direction to hold its leading end firmly against its bottom surface in said site.

2. Toolholder as defined in claim 1, wherein said slidable support surface of said clamping element is formed as a projection extending vertically from said clamping element.

* * * * *